M. LOVE.
Churn.
No. 80,078.
Patented July 21, 1868.
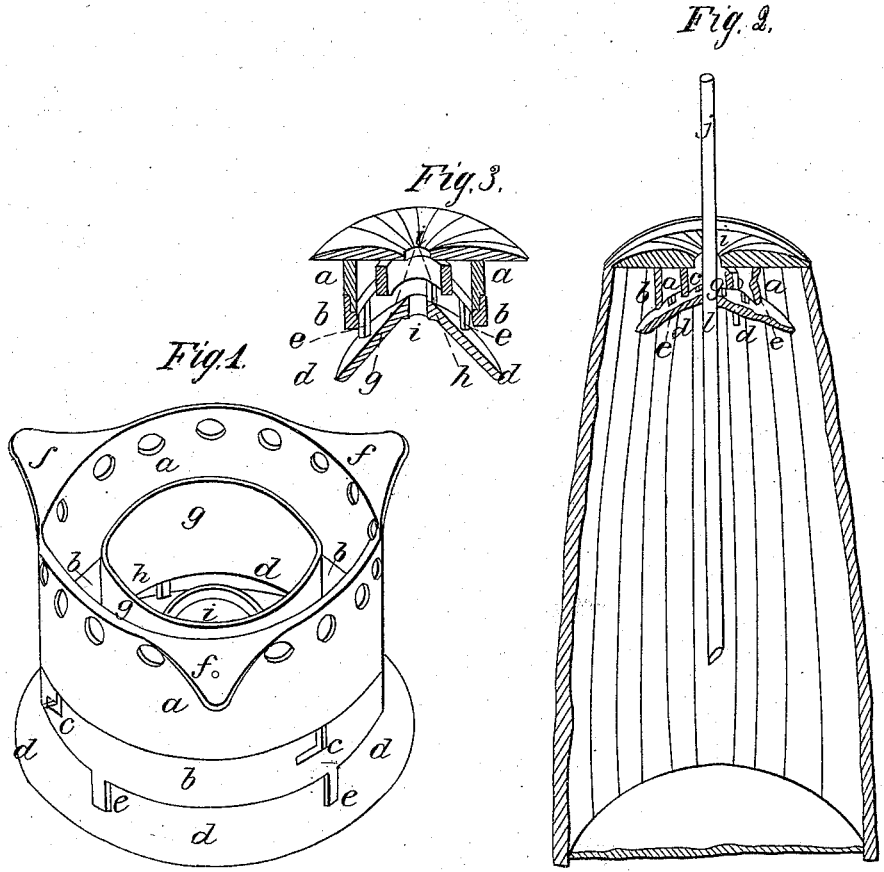
Witnesses:
Maxwell Cameron.
J Campbell
Inventor:
Milton Love.

United States Patent Office.

MILTON LOVE, OF CORRY, PENNSYLVANIA.

*Letters Patent No. 80,078, dated July 21, 1868.*

IMPROVED MACHINE FOR SAVING CREAM WHILE CHURNING.

*The Schedule referred to in these Letters Patent and making part of the same.*

TO ALL WHOM IT MAY CONCERN:

Be it known that I, MILTON LOVE, of the city of Corry, in the county of Erie, in the State of Pennsylvania, have invented a new and useful Machine for Saving Cream while Churning; and I do hereby declare that the following is a full and exact description thereof, reference being had to the accompanying drawings, and to the letters of reference marked thereon.

The nature of my invention consists in attaching a machine to the under side of the lid of the churn, so constructed as to prevent the cream from oozing out around the handle of the dasher.

To enable others skilled in the art to make and use my invention, I will proceed to describe its construction and operation.

I attach to the under side of the lid of the churn a cylindrical piece of brass, or other metal suitable for the purpose, about twice the diameter of the aperture through which the handle of the dasher passes, as shown at $a\ a$ in the accompanying drawing, by means of the screws as at F F, and perforated with holes near the top, acting as an air-chamber. To the bottom of this is attached, by means of crotched screws, $c$, a ring of the same material, $b\ b$, being the lower part of the air-chamber $a\ a$, inside of which is fastened an inverted tunnel, $d\ d\ d\ d$, by the arms $e\ e$. Near the bottom of the tunnel is fastened, by arms as at $h$, another ring, $g\ g$, protecting the air-chamber from the cream. I leave an opening between the ring $g\ g$ and the tunnel $d\ d\ d\ d$, to allow the cream that collects inside to flow back in the churn. The churn-staff or handle of dasher passes through the opening $i$, being the centre of the machine.

What I claim as my invention, and desire to secure by Letters Patent, is—

The combination of the air-chamber $a\ a$ and $b\ b$ with the inverted tunnel $d\ d\ d\ d$, and the ring $g\ g$, for the purposes herein mentioned.

MILTON LOVE.

Witnesses:
MAXWELL CAMERON,
J. CAMPBELL.